June 21, 1966 YOSHIRO NAKAMATSU 3,257,515

APPARATUS FOR AUTOMATIC OPERATION OF A RECORD TAPE IN A RECORDING AND REPRODUCING MACHINE

Original Filed Oct. 25, 1956 2 Sheets-Sheet 1

United States Patent Office 3,257,515

Patented June 21, 1966

3,257,515

APPARATUS FOR AUTOMATIC OPERATION OF A RECORD TAPE IN A RECORDING AND REPRODUCING MACHINE

Yoshiro Nakamatsu, 62 2-chome, Shimouma-cho, Setagaya-ku, Tokyo, Japan

Continuation of application Ser. No. 618,352, Oct. 25, 1956. This application Nov. 13, 1962, Ser. No. 236,884
Claims priority, application Japan, Oct. 26, 1955, 30/28,074
1 Claim. (Cl. 179—100.2)

The subject application is a continuation of my copending application, Serial No. 618,352, filed October 25, 1956, and now abandoned.

This invention relates to an apparatus for automatic operation of a record tape in a recording and reproducing machine and, more particularly to an apparatus for automatic operation of a record tape in a recording and reproducing machine, comprising a short winding tape which is fixed on a winding reel at one end and extends therefrom through a passage forming a part for driving, guiding and operating a recording and reproducing unit to a record tape to be connected therewith; a device for automatically reversing the direction of the motion of the record tape when the winding operation of the record tape comes to an end; a device adapted to change the position of the tracing of the head unit from one record track to the other record track on the tape simultaneously with the change of the direction of the motion of the record tape so that recording or reproducing may be effected on the return winding of the tape as on the forward winding; and the device which is able selectively to stop automatically the motion of the tape or to allow the repetition of the motion of the tape from the beginning, when the sound recording or reproducing has been completed on all the tracks of the tape.

An object of this invention is to provide an improved apparatus for the automatic operation of a record tape, which apparatus is easy to operate and has a cost which is greatly reduced in comparison with apparatus heretofore known. Other features and the advantages of this invention will be made clear hereunder.

The invention will next be explained with reference to the accompanying drawings in which.

Figure 1:
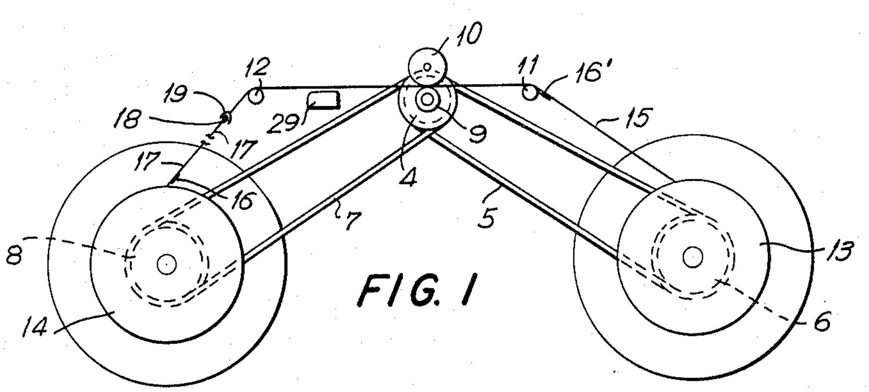
FIGURE 1 is a plan view of one of the embodiments of this invention.
Figure 2:
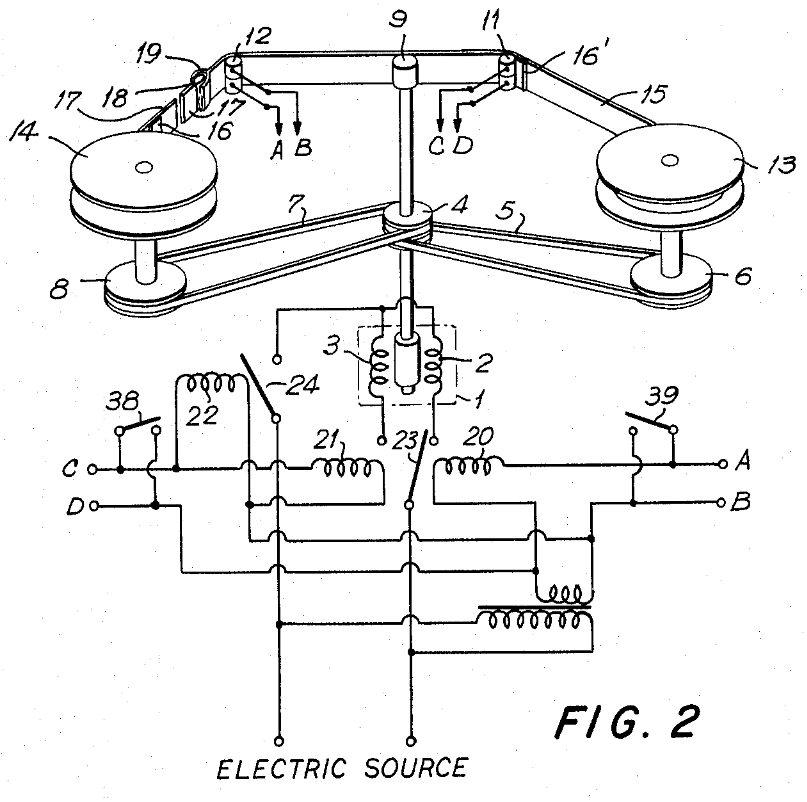
FIGURE 2 is a diagram showing the driving device of the apparatus of FIGURE 1.
Figure 3:
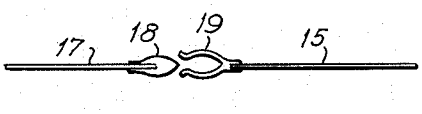
FIGURE 3 is a perspective view showing the connecting ends of a winding tape and a record tape.

In FIG. 1, a relatively short winding tape 15 is fixed on a winding reel 13 at one end and extends around a guide roller 11, between a pinch roller 10 and a capstan 9, around a head unit 29 having recording, reproducing and erasing section, and around a guide roller 12 and is connected at the other end 19 with the end 18 of a sound tape 17. The ends of the winding tape 15 and the sound record tape 17 may be connected with a piece of cellotape or by a female connecting end 19 and a male connecting end 18 provided on the ends of the two tapes respectively as illustrated in FIGURE 3. The winding tape 15 is provided with an electrically conductive part 16′ (FIG. 2) which may be a thin metallic sheet pasted on the tape 15 near the end on the side of the winding reel 13. Similarly the sound tape 17 is provided with a part 16 which is electrically conductive at a point near the end on the side of the return-winding reel 14. The guide rollers 12 and 11 have contact points A, B and C, D respectively as shown in FIG. 2 and when the electrically conductive parts 16, 16′ of the tapes pass bearing against these contact points, electric circuits may be closed to reverse the direction of the motion of the sound record tape as will be explained later. The tapes wound on reels 13, 14 are driven by means of pulleys 6, 8 and a capstan 9 which is driven by a reversible motor 1 (FIG. 2) which has two unit coils 2 and 3 wound in opposite directions.

Figure 6:
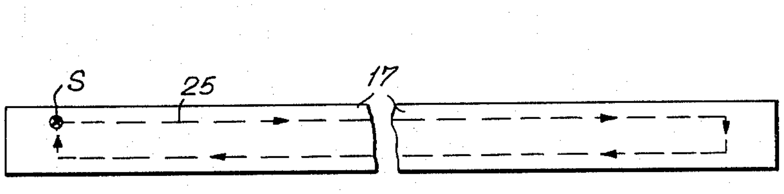
FIGURE 6 is a diagrammatic view of a sound tape.

When the sound tape 17 is wound by the winding reel 13 and the electrically conductive part 16 near the end of the sound tape comes in contact with the contact points A, B of the guide roller 12, electric current passes through the coil 20 to operate a change over switch 23 to reverse the direction of the rotation of the motor 1. At the same time, the head 29 is arranged to move from one side of the tape to the other side of the tape as will be explained later. According to this invention, the sound tape is so arranged as to have two sound tracks, and therefore when the motor is reversed to drive the tape in opposite direction, and the scanning part of the head is moved from one sound track to the other sound track, then sound recording or sound reproduction can be effected similarly on the return winding as on the forward winding. When the return winding proceeds to wind the tape on the reel 14 and the electrically conductive part 16′ on the winding tape 15 comes in contact with the contact points C, D on the guide roller 11, electric current is passed through the coil 21 to operate the change over switch 23 to reverse the direction of the motor and to change the position of the head unit 29 again. However, it is so arranged that on this occasion electric current is passed to a coil 22 which acts to open a switch 24 and to stop the motor 1. Accordingly, the sound recording or sound reproduction may be effected along the two tracks on the tape 17 and when the head 29 returns to the starting point S as shown in FIG. 6, the motor 1 may be stopped. Thus the stopping operation may be carried out automatically. If it is desired, however, to carry on the sound reproduction repeatedly, it may be easily effected by simply setting the switch 24 not to act to open when the tape returns to the starting point S to allow the driving of the tape continuously.

Such an arrangement is not only outside of the subject matter of this invention, but also belongs to a matter which is apparent to those experienced in the art, and therefore it will be hardly necessary to dwell upon such a point. Switches 38 and 39 may be provided for manually closing the circuit to energize the coil 20 or 21, in order to manually reverse the direction of the rotation of the motor 1 when desired.

With the conventional apparatus, when continuous sound reproduction is desired, it has been necessary to connect a tape in a circular endless form, and as a result to use a voluminous, complicated and unstable endless apparatus and a tank for a record tape when the tape is long.

In contrast, with this invention, the tape has two tracks which may be used continuously, and thus the length of the tape can be made comparatively short. Moreover, the tape is wound on reels 13 and 14 and not in a circular form and hence may have a great length with no necessity of providing a tape tank. The apparatus is stable and compact and the construction is simple to bring about the benefit of less cost in production.

While a reversible motor is employed in the embodiment above described, a motor of rotation in one direction may be used by using an arrangement comprising belts, pulleys and the like and adapted to change the direction of the motion of the tape when the ends of the tape approach the head. It is also possible to operate the reversible relay by a photo-cell in place of the combination of electrically conductive parts 16, 16′ and contact points A, B, C, D which are employed in the foregoing embodiment.

Figure 4:
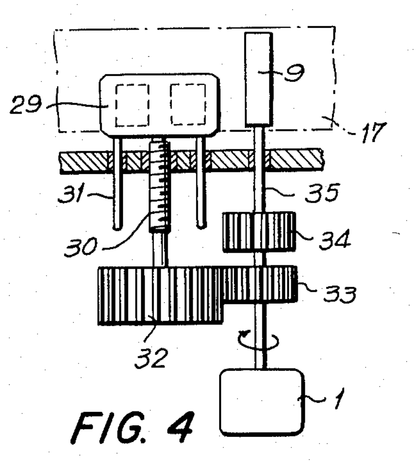
FIGURE 4 is a diagram illustrating the mechanism for operating the head unit of the apparatus.

With reference to FIG. 4, now the device for changing the position of the head 29 will be explained. The capstan 9 is driven by the motor 1 through the shaft 35. On the shaft 35 are mounted gears 33 and 34. These gears are mounted respectively in such a way as to rotate with the shaft 35 when the shaft 35 turns in one direction but remains idle when the shaft rotates in the other direction, and the directions of the rotation of these two gears are opposite to each other. The head 29 can be moved up and down by guides 31 and a screw 30 which is rotated by a gear 32. When the gear 32 is meshed with the gear 33 and the gear 33 is rotated by the motor 1 in the direction of the arrow in the drawing together with the shaft, the gear 32 is driven by the motor 1 and the screw 30 is rotated to raise the head 29 and the gear 32 until the gear 32 goes out of the engagement with the gear 33 and comes into meshing relation with the gear 34. In this condition, the gear 34 is idle and hence the rotation of the gear 32 is stopped to stop the raising of the head 29. When the motor 1 is reversed to rotate in opposite direction, and the tape 17 begins to move in the opposite direction, the gear 34 is now driven by the shaft 35 to rotate therewith the gear 32 in the opposite direction and to lower the head 29 and the gear 32 until the gear 32 goes out of the engagement with the gear 34 which is now idle. The motion of the head is thus stopped. In this way the position of the head 29 may be automatically changed on every occasion when the direction of the rotation of the capstan 9 is reversed, and thus the scanning position of the head may be changed accordingly.

Figure 5:
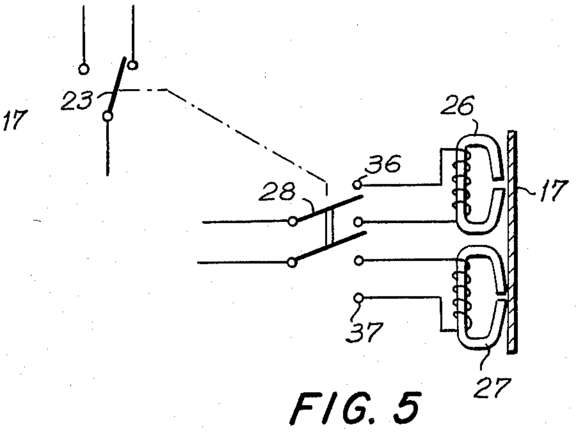
FIGURE 5 is a diagram illustrating a modified embodiment which has two fixed head units for recording or reproduction.

In place of the device in which one head unit is mechanically raised or lowered as described above, a device wherein two head units 26 and 27 are arranged to be operated alternatively to change the position of the head working on the tape by a change over switch 28 may be employed as illustrated in FIG. 5. In such a device, the change over switch 28 is so arranged as to be operated simultaneously with the change over switch 23 for changing the direction of the rotation of the motor 1.

When two head units are used, as described in the above it may be also possible to operate the two units simultaneously by a slight modification of the apparatus so that stereo-effect may be obtained. For example, in FIG. 5, the change over switch 28 may be so arranged as to be connected with either of the head units 26 and 27, the change over switch being a double pole switch which is moved in association with the switch 23. When the apparatus is used as a stereo-phonic apparatus, the change over switch 28 may be arranged to be on with the head unit 26 and the outputs are taken from the terminals 36 of the head unit 26 and the terminals 37 of the head 27 simultaneously.

According to this invention as described above, in continuous reproducing from a sound record tape, the complicated and troublesome operations required with the conventional sound recording and reproducing apparatus heretofore known, are simplified and may be carried out automatically. For continuous sound reproduction, there will be no longer the necessity of connecting the sound tape in an endless circular form as with the conventional apparatus and as the result various disadvantages as described before pertaining to prior art devices may be eliminated completely.

Figure 7:
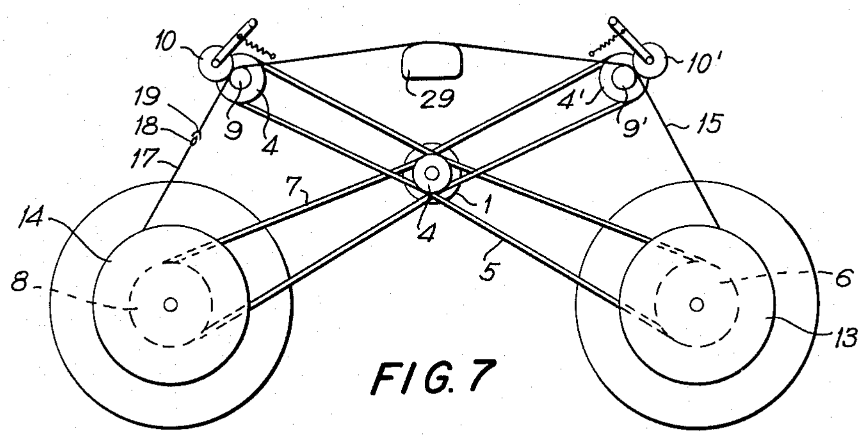
FIGURE 7 is a plan view of the second embodiment of this invention in which two capstans are employed.

It is to be understood that the apparatus of this invention can be altered and modified in many ways from the embodiment as described in the above without departing from the scope and the spirit of this invention. For instance, while in the above embodiment a single capstan 9 is employed, two capstans 9, 9′ may be employed. FIGURE 7 illustrates such an arrangement as an example. In FIGURE 7, 9 and 9′ represent two capstans and 10 and 10′ pinch rollers associated therewith. These capstans are rotated by the motor 1 by means of belts. The sound recording or reproducing head 29 is arranged between the two capstans 9 and 9′. The winding tape 15 and the sound tape 17 are connected similarly as the apparatus of FIG. 1 at 18 and 19. In the apparatus of FIG. 7, the capstans 9 and 9′ act at the same time for guide rollers 11 and 12 and the contact points A, B and C, D are provided thereon respectively. (The contact points may be provided on pinch rollers 10, 10′ instead, if desired.) Moreover the capstan 9′ is so arranged to be idle or for free rotation when the tape moves from right to left and makes driving rotation when the tape moves from left to right, while the capstan 9 makes its free rotation and driving rotation in the opposite direction. This arrangement is preferable since the tape is pulled by either the capstan 9 or 9′, and is not affected by the action of the other capstan which may tend to cause a slack in the tape between the two capstans 9 and 9′ when the tape is positively driven by the capstan behind the head in the direction of the motion of the tape.

This invention may also be applied not only to the tape of a sound recording and reproducing apparatus but also to other apparatus wherein tapes are used, for example, to a cinematograph projector.

What is claimed is:

Apparatus comprising winding and supply reels; tape driving, tape guiding, and tape recording and reproducing means defining a tape passage and positioned along said passage at different distances from said winding reel; a relatively short winding tape fixed at an end to the winding reel and adapted for extending along said passage to a second end between said supply reel and said means; a sound tape having one end connected to the supply reel and having a second end for connection to the winding tape; connecting means on the second ends of the respective tapes for connecting the same together; electrically detectable means on the winding tape near its one end; further electrically detectable means on the sound tape near the one end thereof; first and second detection means disposed along the passage in association with respective of said reels to detect the presence of the respective detectable means; an electric circuit actuable by the presence of the detectable means at either of said detection means to cause the driving means to reverse the driving of the tapes on detection of either of said electrically detectable means; said circuit including means to control said recording and reproducing means to shift to a transversely displaced track on the sound tape upon reversing of the drive of said tape; and further selectively operable circuit means for stopping the driving means when the electrically detectable means on the winding tape is detected, the latter said electrically detectable means being positioned on the winding tape relative to the second end of the winding tape so that the latter said end is stopped between the supply reel and the means defining the tape passage.

References Cited by the Examiner

UNITED STATES PATENTS

| | | | |
|---|---|---|---|
| 1,655,297 | 1/1928 | Thornton | 352—157 X |
| 2,345,869 | 4/1944 | Edwards. | |
| 2,519,245 | 8/1950 | Greenleaf et al. | 179—100.2 |
| 2,535,497 | 12/1950 | Jones | 179—100.2 |
| 2,668,059 | 2/1954 | Roberts | 179—100.2 X |
| 2,694,110 | 11/1954 | Roberts | 179—100.2 |
| 2,732,144 | 1/1956 | Jones | 179—100.2 X |
| 2,793,253 | 5/1957 | Howey. | |
| 2,891,736 | 6/1959 | Blaes | 352—157 X |
| 2,914,264 | 11/1959 | Blain et al. | 179—100.2 X |

BERNARD KONICK, *Primary Examiner.*

IRVING L. SRAGOW, *Examiner.*